United States Patent Office 3,510,277
Patented May 5, 1970

3,510,277
METALLIC ARTICLE
Walther Schmidt, Henrico County, Va., assignor to Reynolds Metals Company, Richmond, Va., a corporation of Delaware
Original application Feb. 26, 1962, Ser. No. 175,893, now Patent No. 3,247,557, dated Apr. 26, 1966. Divided and this application Apr. 22, 1966, Ser. No. 546,135
Int. Cl. B22b 15/20; B22d 19/00
U.S. Cl. 29—183.5               6 Claims This application is a division of application Ser. No. 175,893, filed Feb. 26,1962, and now Pat. No. 3,247,557.

This invention relates to the solidification of molten metal, as by casting, annd particularly to an improved method for controlling the rate of cooling molten metal to achieve desirable metallurgical properties.

It is generally considered to be advantageous in metal casting procedures to remove heat rapidly and uniformly from the solidifying metal. The actual achievement of such a result is extremely difficult, as a practical matter, since attempts to increase the cooling rate usually cause relatively abrupt thermal gradients. Such gradients coincide with numerous deleterious effects, among which are segregation of constituents, porosity, and splitting or cracking.

The cooling mechanism, including the direction and rate of heat removal, is a principal factor in controlling internal temperature variations. This is exaggerated in circumstances where large bodies of hot metal are cooled by initially solidifying the exterior surface, as in methods which employ a heat-conductive mold. For example, in continuous casting systems which utilize an annular mold shell, it has been a continuing objective to reduce the withdrawal of heat radially through the shell wall and remove proportionally more heat in an axial direction.

The art has thus been faced with many problems related to heat removal, stemming from the lack of effective means to remove heat from throughout the body of molten metal, especially at a uniform rate. The present invention provides an effective system for that purpose, having widespread applicability in controlling heat removal to avoid many of the inherent defects of previous practices.

In accordance with the invention, particles capable of substantial heat absorption are introduced into a body of molten metal, and the quantity of particles and the rate of their addition to the melt are controlled to provide sufficient exchange of heat between the melt and the particles to solidify the melt without substantially melting the particles. The particles may be dispersed throughout the metal, in order to minimize thermal stresses upon cooling, or the introduction of particles may be localized to provide compensation for other modes of heat removal.

While capable of accomplishing relatively uniform heat extraction from the melt, the particles can also provide an extremly rapid rate of solidification, with consequent improvement in metallurgical properties, such as the achievement of fine grain structure, without the difficulties with thermal stresses which are encountered when rapid cooling is attempted by conventional practices.

The particles employed may consist of the same or different metals than the melt, or they may be non-metallic. Even non-metallic particles having impractically low heat-absorptive capacity may be intermixed with metallic particles to form a combination capable of extracting sufficient heat, while at the same time supplying desired special constituents. In addition, metallic particles may be prepared for use in the practice of the invention having various materials incorporated directly in the individual particles.

Particles in a wide variety of configurations are useful in the practice of the invention. The present preferred form of metal particles are those which may be produced by centrifugal casting techniques and range in size from about 5 to about 60 mesh (U.S. Standard Sieve). Particles both larger and smaller have utility, but much larger particles have correspondingly reduced surface area per unit mass (thereby absorbing heat at a slower rate) and finer particles are proportionally more difficult to introduce into the melt.

Similar practical limitations apply to non-metallic particles, and it is generally preferable to incorporate non-metallic material by introducing the material in convenient comminution to the molten metal from which particles may be cast. The resulting composite particles, having both metallic and non-metallic constituents, and then used in the method of the invention.

It is to be emphasized that the present method envisages the use of a substantial weight of particles in proportion to the weight of the melt. Thus, a weight of particles in the order of half of the weight of a melt of the same composition would be employed in the absence of supplemental cooling. Moreover, a substantial proportion of the particles should be submerged in the melt by some means, such as by pouring the melt around the particles, and by propelling the particles at substantial velocity into the melt.

The cooling rate of the melt may be controlled in several ways. As previously mentioned, the size of the particles (in terms of exposed surface area) is one factor. Also, the specific heat of the material from which the particles are made is a consideration. Then, too, the weight proportion of the particles may be adjusted to achieve the desire rate of heat transfer from the melt. When use is made of supplemental cooling, it is still desirable to employ a sufficient quantity of particles to cause abrupt cooling and rapid solidification of the metal. For that purpose, a minimum of quantity (in terms of the thermal capacity of metal particles of the same composition as the melt and in the preferred size range) of about 10% by weight is preferred.

For a better understanding of the invention and its various objects, advantages and details, reference is made herein to present preferred embodiments thereof which are shown, for purposes of illustration only, in the accompanying drawings. In the drawings:

FIG. 1 is a pen and ink reproduction of a photomicrograph (mag. 100×) of a section of 1100 aluminum alloy casting which has been slowly cooled, referred to in Example 1; and FIG. 2 is a photomicrograph (also 100× mag.) of a section of 1100 aluminum alloy casting produced in accordance with the invention from about 70% molten metal and about 30% particles, as exemplified by the practice of Example 1.

The following examples are illustrative of the invention:

EXAMPLE 1

A 6-inch interior diameter cylindrical pot, made of "Marinite" (a heat insulating material consisting of asbestos and an inorganic binder), was filled to a depth of about one-half inch with liquid 1100 aluminum alloy, the metal temperature being about 1350° F. The weight of the melt was about 1.3 pounds. Approximately 0.8 pounds of 1100 alloy cast aluminum particles in the size range substantially −5+10 mesh (U.S. Standard) were introduced into the melt by impelling the particles at a velocity of about 50 ft./sec. The liquid aluminum solidified rapidly upon addition of the particles.

Metallographic examination of a section of the frozen composite showed that the solid particles which had been added to the liquid aluminum were substantially unmelted, and had retained their original fine dendritic structure. The originally liquid part of the composite, which solidified by heat exchange with the solid particles, showed a very fine-grained structure (see FIG. 2) not normally found in conventional cast aluminum ingots. For purposes of comparison, FIG. 1 shows the structure obtained by permitting a similar total weight of molten 1100 alloy to solidify in the mold without forced cooling.

Two cast composites prepared as above were machined to a thickness of .500". One machined sample was hot rolled to .125" in one pass and subsequently cold rolled successively to .115", .020", .010", .005", and .0025", without intermediate annealing; and the other was cold rolled, with substantially the same succession of reductions. In both instances, a sound strip was produced.

EXAMPLE 2

A procedure similar to Example 1 may be employed to cast zinc, the weight of the liquid zinc being about 3.1 pounds and the temperature of the liquid zinc being about 850° F. To the molten zinc is added about 2.35 pounds of zinc particles in the size range substantially −5+10 mesh (U.S. Standard). The liquid zinc solidifies rapidly after the particles are introduced, and comparable results are achieved.

EXAMPLE 3

As in Example 1, the pot is filled to a depth of approximately one-half inch with liquid 7075 aluminum alloy, the metal being about 1350° F. The weight of the liquid metal is about 1.3 pounds. To the liquid metal is added approximately 1 pound of similarly sized 7075 cast aluminum alloy particles, the particles having been dried by pre-heating and fed to the melt at a temperature of about 400° F. The liquid aluminum alloy rapidly solidifies and the composite is then subjected to roll-forming to yield a wrought product.

EXAMPLE 4

A cast iron mold, dimensionally similar to that of Example 1, is filled to a depth of approximately one inch with liquid 1100 aluminum alloy. The weight of the liquid aluminum is approximately 2.6 pounds, the temperature thereof being about 1350° F. After pouring, time is allowed for the formation of a solid metallic aluminum layer approximately ⅛" thick on the bottom of the mold (due to heat absorption by the mold), after which a mixture of boron carbide particles and 1100 alloy aluminum particles is projected well into the remaining molten aluminum at a velocity of about 200 feet per second. The total weight of carbide and aluminum particles is about 1.1 pounds, of which approximately half the weight is carbide and the other half is 1100 alloy aluminum. The remaining liquid aluminum rapidly solidifies due to the high heat absorption of the particles. The solidified composite consists of a central layer of aluminum in which are dispersed the substantially unmelted particles, the aluminum particles retaining their fine dendritic cast structure. The outer layers consist of fine-grained cast 1100 alloy aluminum. The composite can be rolled or otherwise worked by conventional means.

What is claimed is:

1. A composite article of manufacture comprising discrete aluminum or aluminum alloy metal particles coarser than 100 mesh in size disposed within a matrix of aluminum or aluminum alloy metal in the as-cast condition, said particles exhibiting fine dendritic cell size typical of cast particles of that particle size, and the metallurgical structure of the matrix adjacent said particles being characterized by fine grain size attributable to rapid cooling through heat exchange between said particles and the adjacent portions of the matrix.

2. The article of claim 1 wherein said particles and said matrix are of the same aluminum alloy.

3. The article of claim 1 wherein said particles are finer than 5 mesh but coarser than 60 mesh.

4. The article of claim 1 wherein said particles comprise from 10 to 50 weight percent.

5. The article of claim 1 wherein said particles comprise 10 to 50 weight percent and are finer than 5 mesh but coarser than 60 mesh, and said particles and said matrix are of the same aluminum alloy.

6. The article of claim 1 wherein said particles are susceptible to melting near the liquidus temperature of said metal matrix.

References Cited

UNITED STATES PATENTS

| | | | |
|---|---|---|---|
| 2,189,387 | 2/1940 | Wissler | 75—.5 |
| 2,994,102 | 8/1961 | Payton | 264—8 |

RICHARD O. DEAN, Primary Examiner

U.S. Cl. X.R.

29—191.2